(12) United States Patent
Kinnaird et al.

(10) Patent No.: US 11,248,506 B2
(45) Date of Patent: *Feb. 15, 2022

(54) DUAL PURPOSE HEATING AND COOLING ELEMENT FOR EXHAUST AFTERTREATMENT SYSTEM

(71) Applicant: Faurecia Emissions Control Technologies, USA, LLC, Columbus, IN (US)

(72) Inventors: Edward Kinnaird, Columbus, IN (US); John Rohde, Columbus, IN (US)

(73) Assignee: Faurecia Emissions Control Technologies, USA, LLC, Columbus, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/857,978

(22) Filed: Apr. 24, 2020

(65) Prior Publication Data

US 2021/0332729 A1 Oct. 28, 2021

(51) Int. Cl.
*F01N 3/20* (2006.01)

(52) U.S. Cl.
CPC ........... *F01N 3/2026* (2013.01); *F01N 3/206* (2013.01); *F01N 3/208* (2013.01); *F01N 3/2066* (2013.01); *F01N 2610/02* (2013.01); *F01N 2610/146* (2013.01); *F01N 2610/1453* (2013.01)

(58) Field of Classification Search
CPC ........ F01N 3/206; F01N 3/2066; F01N 3/208; F01N 2610/02; F01N 2610/1453; F01N 2610/146
See application file for complete search history.

(56) References Cited

U.S. PATENT DOCUMENTS

| | | | |
|---|---|---|---|
| 6,834,498 B2 * | 12/2004 | van Nieuwstadt | F01N 13/009 60/286 |
| 2008/0236147 A1 * | 10/2008 | Van Vuuren | F01N 3/2066 60/295 |
| 2009/0107120 A1 | 4/2009 | Bruck et al. | |
| 2013/0118155 A1 * | 5/2013 | Domon | F01N 3/208 60/274 |
| 2014/0166126 A1 * | 6/2014 | Turner | F01N 3/2066 137/334 |
| 2014/0260207 A1 | 9/2014 | Shovels | |
| 2015/0267582 A1 * | 9/2015 | Schaffer | F01N 3/208 60/320 |
| 2020/0191032 A1 * | 6/2020 | Collura | F01N 3/208 |

* cited by examiner

*Primary Examiner* — Audrey B. Walter
(74) *Attorney, Agent, or Firm* — Barnes & Thornburg LLP

(57) ABSTRACT

An automotive exhaust aftertreatment system includes a doser. The doser includes a doser body and a valve system that opens to discharge a reagent into exhaust gas. The doser includes a heater to heat the reagent prior to releasing the reagent into the exhaust gas.

34 Claims, 4 Drawing Sheets

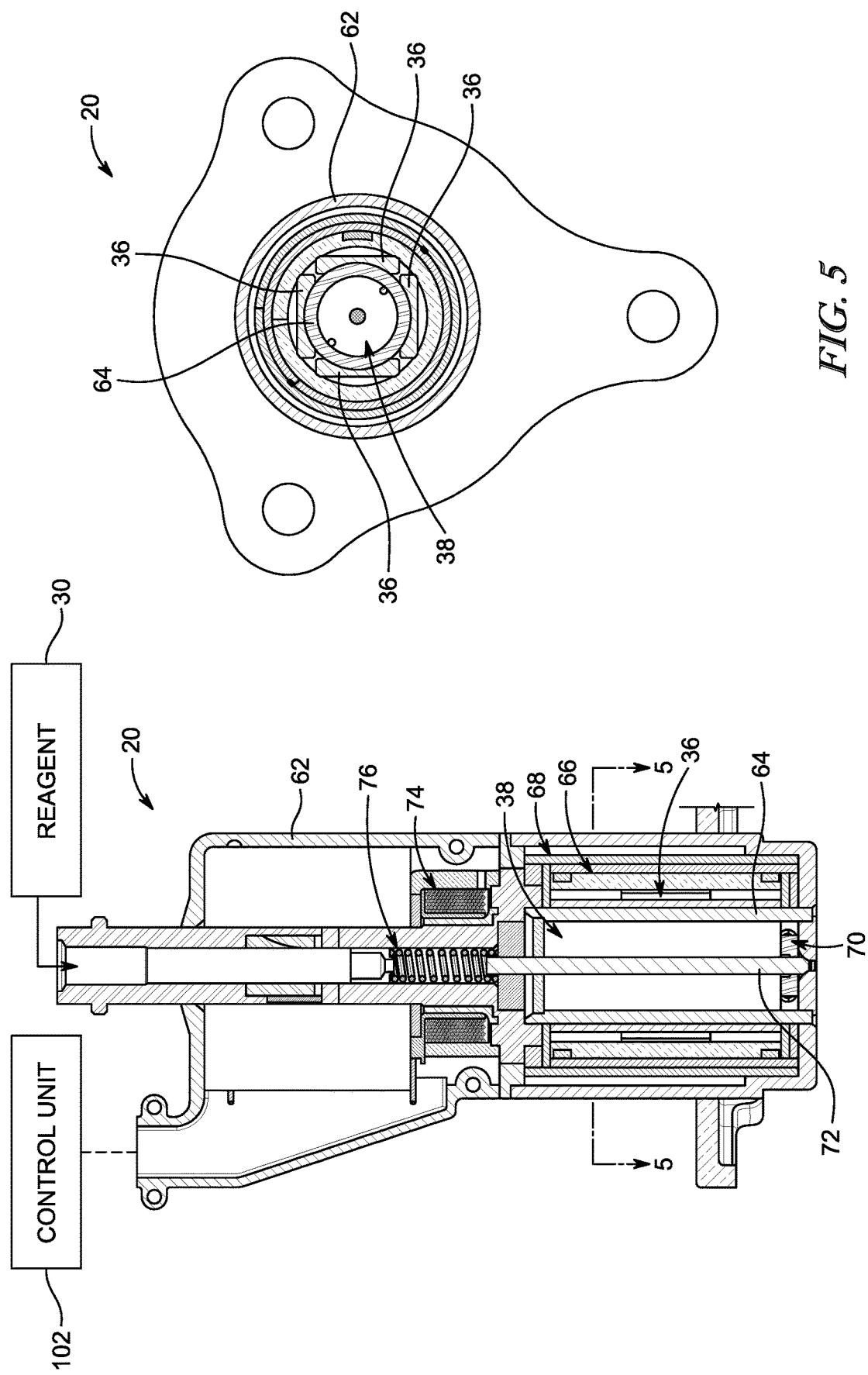

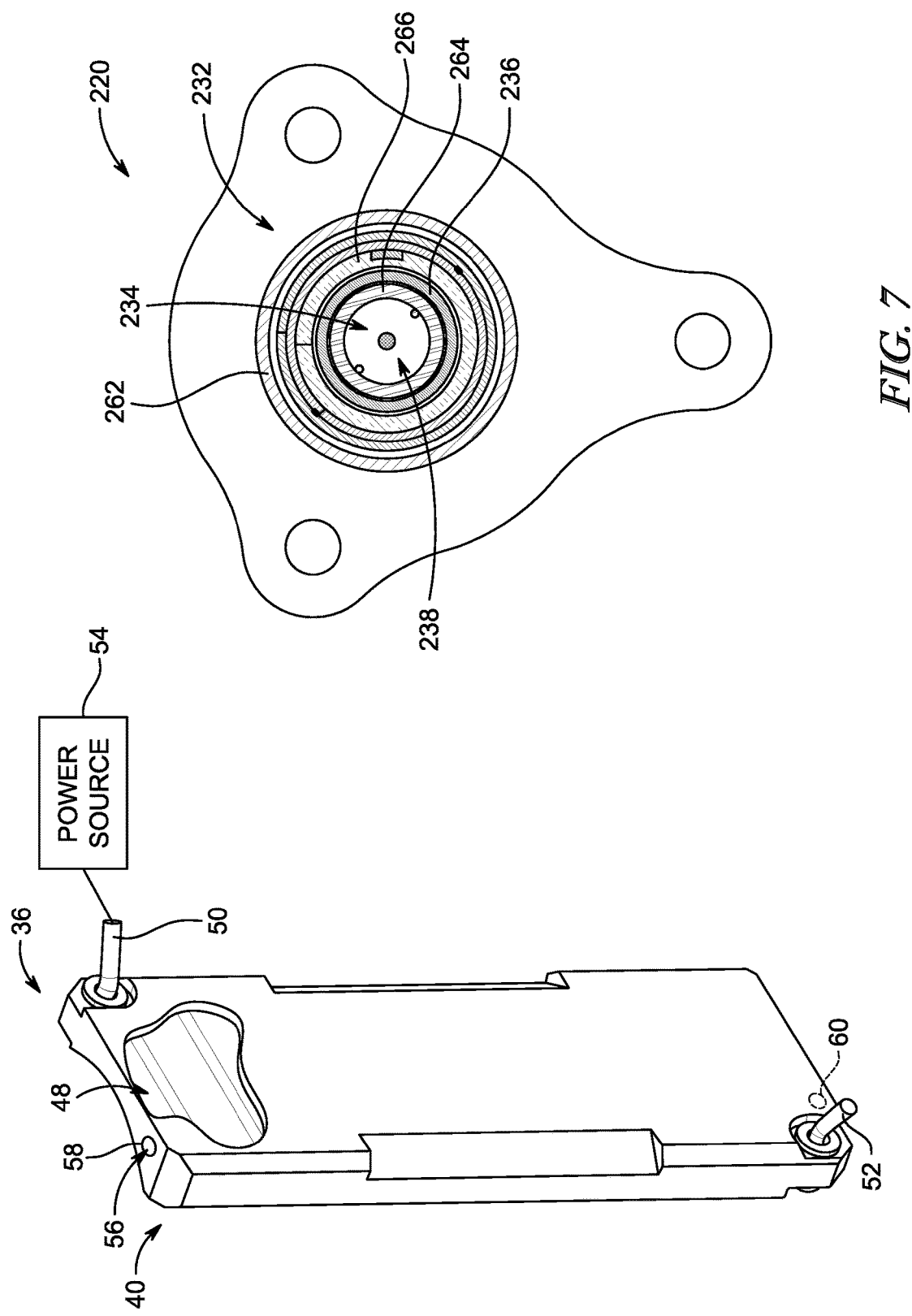

DUAL PURPOSE HEATING AND COOLING ELEMENT FOR EXHAUST AFTERTREATMENT SYSTEM

BACKGROUND

The present disclosure relates to exhaust aftertreatment systems for automotive applications, and particularly to an aftertreatment system including a doser for injecting a reagent into exhaust gas.

SUMMARY

A vehicle, in accordance with the present disclosure, includes a combustion engine and an automotive exhaust aftertreatment system. The combustion engine is configured to produces exhaust gas as a byproduct of a combustion reaction. The aftertreatment system is configured to receive and treat the exhaust gas to remove effluents before releasing the exhaust gas into the atmosphere.

In illustrative embodiments, the exhaust aftertreatment system includes an exhaust pipe, a plurality of exhaust treatment devices, and a doser. The doser is mounted to a reagent mixer and is configured to deliver reagent (sometimes called diesel exhaust fluid, DEF, and or AdBlue™) into the reagent mixer for mixing with the exhaust gas. The reagent enables chemical reaction of the exhaust gas to reduce nitrogen-oxides ($NO_x$).

In illustrative embodiments, the vehicle further includes a temperature-management system that is coupled to the doser. The temperature-management system controls a temperature of the reagent injected into the exhaust gas while preventing overheating of the doser. The temperature-management system is configured to heat the reagent prior to the reagent being discharged into the reagent mixer to increase efficiencies of the aftertreatment system. The temperature-management system is also configured to remove heat from the doser so that components within the doser are not exposed to prolonged periods of elevated temperatures that can damage electronic components.

In illustrative embodiments, the temperature-management system includes a temperature-management module, a control unit, and a sensor. The temperature-management module includes a heating element and a cooling element to both heat the reagent and cool components within the doser. The control unit is configured to monitor and control operations of the temperature-management module based on signals from the sensor. The signals may be indicative of sensed conditions within the doser such as a temperature of electronic components.

In illustrative embodiments, the control unit may be configured to calculate a temperature of the electronic components in the doser using the signals from the sensor. The control unit may output a command to deactivate the heating element and activate the cooling element when a temperature of the electronic components reaches a predetermined threshold to minimize damage by preventing overheating.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 1:
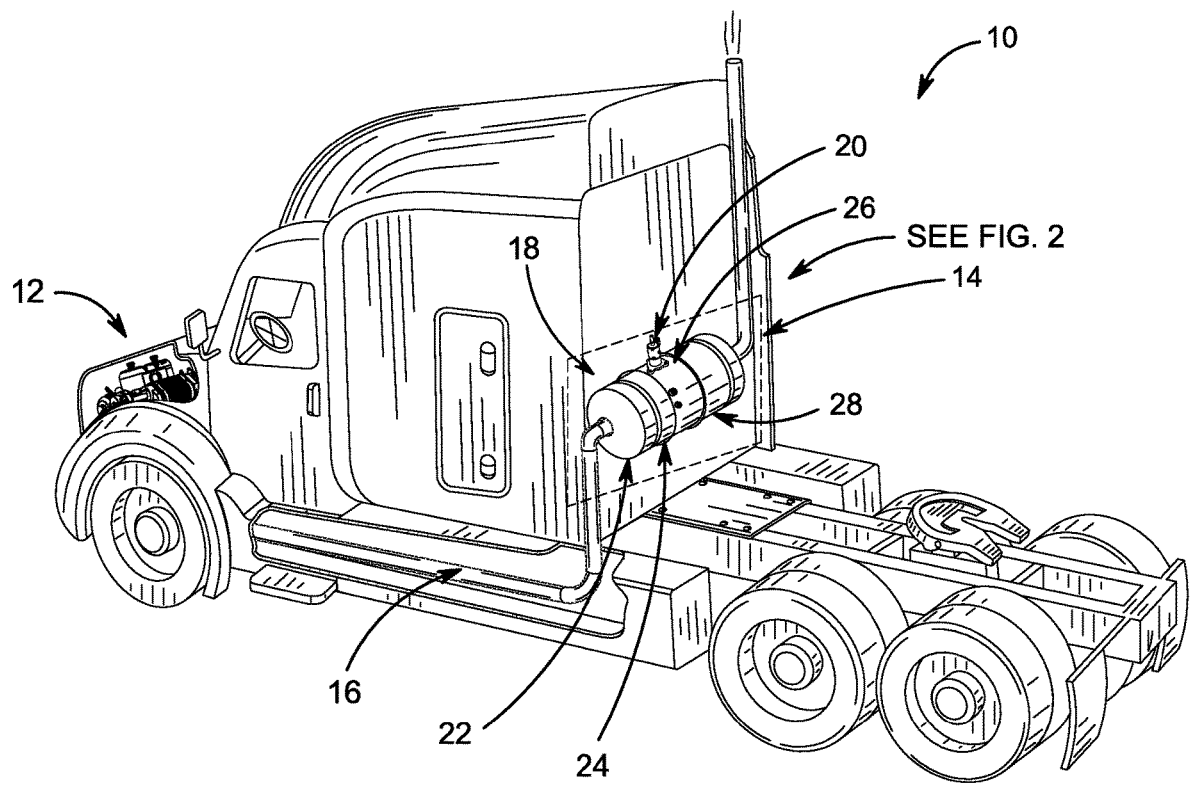
Figure 2:
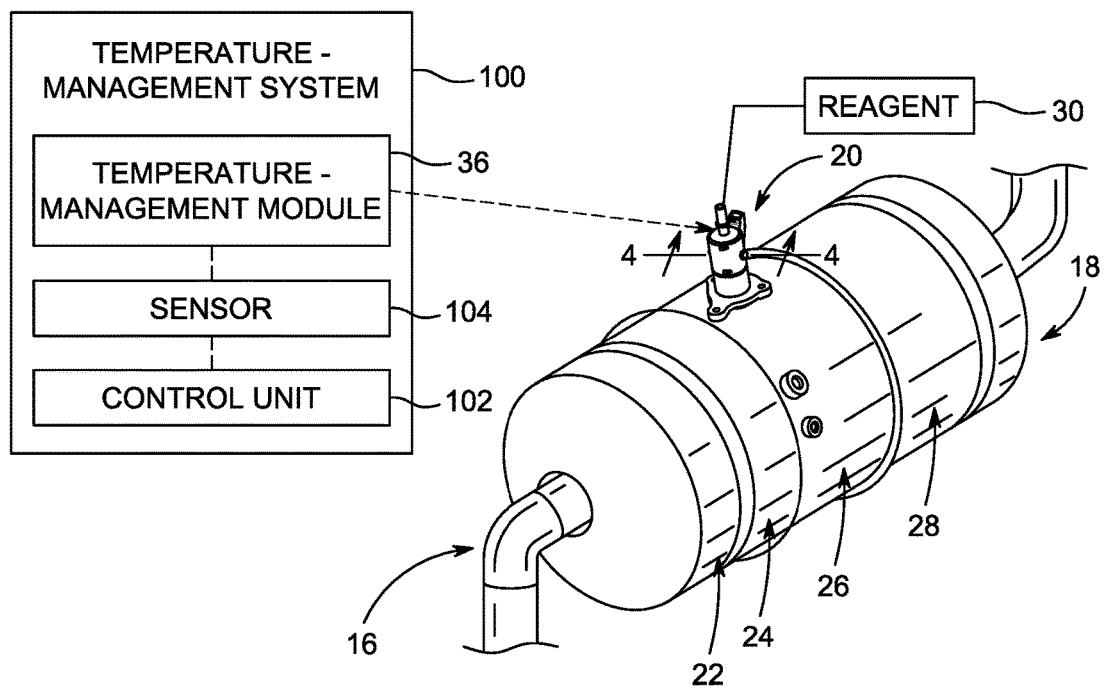
Figure 3:
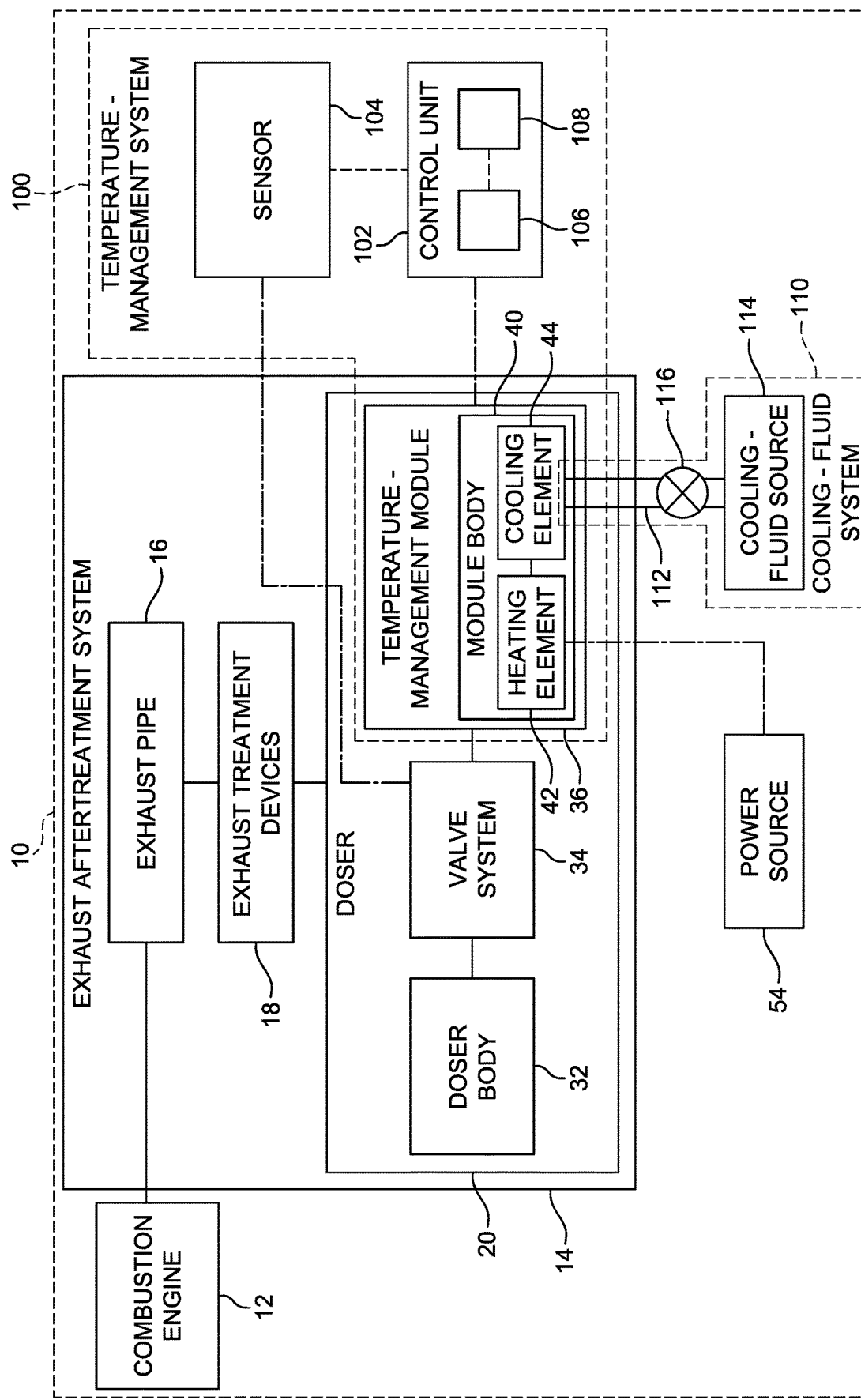

The detailed description particularly refers to the accompanying figures in which:

FIG. 1 is perspective view of an over-the-road vehicle that includes a combustion engine and an automotive exhaust aftertreatment system for reducing various effluents, such as nitrogen oxides (NOx), in engine exhaust gas before releasing the engine exhaust gas into the atmosphere;

FIG. 2 is an enlarged perspective and diagrammatic view of a portion of the exhaust aftertreatment system including a selective catalytic reduction unit (SCR), a doser mounted upstream of the SCR and configured to discharge a reagent to enable chemical reaction of the exhaust gas to reduce nitrogen-oxides in the exhaust gas, and a temperature-management system configured to heat the reagent prior to the reagent being discharged into the exhaust gas and cool components within the doser to minimize damage to the components in the doser;

FIG. 3 is a diagrammatic view of the vehicle from FIG. 1 showing that the doser includes a doser body, a valve system, and a temperature-management module configured to heat the reagent prior to the reagent being discharged into the exhaust gas and cool the valve system within the doser body to minimize damage to the valve system;

FIG. 4 is a sectional view of the doser taken along line 4-4 in FIG. 2 showing that the doser body includes an outer doser housing, an inner doser conduit that extends through the outer doser housing to define a fluid passageway that conducts the reagent, and thermal insulation between the outer doser housing and the inner doser conduit and showing the temperature-management module coupled to the inner doser conduit to provide heat to the inner doser conduit and the reagent flowing therethrough;

FIG. 5 is a sectional view of the doser taken along line 5-5 in FIG. 4 showing that the doser includes a plurality of temperature-management modules arranged circumferentially around the inner doser conduit;

FIG. 6 is a perspective view of one of the temperature-management modules from FIGS. 4 and 5 with a portion cut away to show that the temperature-management module includes a module body, a heating element arranged within the module body and at least one cooling-fluid passageway that extends through the module body and around the heating element to cool the heating element; and FIG. 7 is a sectional view similar to FIG. 5 showing another embodiment of a doser that includes a single temperature-management module that extends circumferentially around an inner doser conduit of the doser.

DETAILED DESCRIPTION

For the purposes of promoting an understanding of the principles of the disclosure, reference will now be made to a number of illustrative embodiments illustrated in the drawings and specific language will be used to describe the same.

An over-the-road vehicle 10 in accordance with the present disclosure is shown in FIG. 1 and diagrammatically in FIG. 3 and includes a combustion engine 12 and an automotive exhaust aftertreatment system 14. The combustion engine 12 is configured to receive and combust a mixture of fuel and air which produces exhaust gas as a byproduct of the combustion reaction in the combustion engine 12. The exhaust gas is directed from the combustion engine 12 toward the exhaust aftertreatment system 14 through an exhaust pipe 16. The aftertreatment system 14 is coupled to the exhaust pipe 16 and is configured to receive and treat the exhaust gas by removing effluents from the exhaust gas before releasing the exhaust gas into the atmosphere.

The exhaust aftertreatment system 14 includes the exhaust pipe 16, a plurality of treatment devices 18, and a doser 20 as shown in FIGS. 1-3. The exhaust pipe 16 extends between and interconnects the combustion engine 12 and the plurality of treatment devices 18 to conduct the exhaust gas from the combustion engine 12 to each of the treatment devices 18. The plurality of treatment devices 18 are arranged in series with one another and each are adapted to remove a designated effluent or pollutant. The plurality of treatment devices 18, in the illustrative embodiment, include, a diesel oxidation catalyst (DOC) 22, a diesel particulate filter (DPF) 24, a reagent mixer 26, and a selective catalytic reduction unit (SCR) 28. In other embodiments other types of treatment devices 18 may be included in series or in parallel with one another. The doser 20 is mounted to the reagent mixer 26 and is configured to deliver reagent 30 into the reagent mixer 26 for mixing with the exhaust gas in order to enable chemical reaction of the exhaust gas to reduce nitrogen-oxides ($NO_x$).

The vehicle further includes a temperature-management system 100 that is coupled to the doser 20 to control a temperature of the reagent 30 being discharged from the doser 20 and other components within the doser 20 as shown in FIG. 2. The temperature-management system 100 is configured to heat the reagent 30 prior to the reagent 30 being discharged into the reagent mixer 26 to increase efficiencies of the aftertreatment system 14. The temperature-management system 100 is also configured to remove heat from the doser 20 so that components within the doser 20 are not exposed to prolonged periods of elevated temperatures.

The reagent mixer 26 is mounted upstream of the SCR 28 so that the doser 20 injects the reagent 30 into the exhaust gas for mixing with the exhaust gas before reaching the SCR 28. Chemical reaction between the reagent 30 and a catalyst in the SCR 28 transforms $NO_x$ present in the exhaust gas into molecular nitrogen and water vapor, both of which are not harmful to the environment. Mixing efficiency and/or transformation rate of the $NO_x$ may be increased by increasing a temperature of the exhaust gas and the reagent 30 in the reagent mixer 26.

Under normal operating conditions, such as after a warm-up period of the combustion engine 12, the exhaust gas has a temperature that is sufficient to maximize mixing of the reagent 30 with the exhaust gas and a transformation rate of the $NO_x$. Accordingly, the aftertreatment system 14 may be designed such that efficiencies of the aftertreatment system 14 are greatest when a temperature of the combustion engine 12 and/or the exhaust gas are at a target temperature or within a target temperature range. However, outside of normal operating conditions, efficiencies of the aftertreatment system 14 may be lower. In one example, during the warm-up period, temperatures of the combustion engine 12 and the exhaust gas may be less than the target temperature or target temperature range. In another example, during a regenerative cycle to clean the DPF 24, temperatures may exceed the target temperature or target temperature range. If the temperature of the exhaust gas exceeds a threshold temperature, various components of the aftertreatment system 14, such as the doser 20, may become damaged and may need to be replaced.

The doser 20 includes a doser body 32, a valve system 34, and a temperature-management module 36 that is configured to regulate a temperature of the reagent 30 and components within the doser 20 to maximize efficiencies of the aftertreatment system 14 while minimizing damage to the doser 20 as shown in FIG. 3. The doser body 32 is mounted to the reagent mixer 26 to discharge the reagent 30 into the reagent mixer 26 when the combustion engine 12 is in operation and producing exhaust gas. The valve system 34 is configured to control release of the reagent 30 from the doser body 32 by selectively opening and closing a fluid passageway 38 formed by the doser body 32. The temperature-management module 36 is located within the doser body 32 and is configured to heat the reagent 30 in the fluid passageway 38 prior to the reagent being discharged into the reagent mixer 26 when a temperature of the exhaust gas is below the target temperature or the target temperature range.

The temperature-management module 36 is also configured to regulate a temperature of components within the doser 20 by cooling the components when a temperature within the doser 20 exceeds a predetermined threshold. The temperature-management module 36 includes a module body 40, a heating element 42, and a cooling element 44. Both the heating element 42 and the cooling element 44 are located within the module body 40. The heating element 42 is configured to provide heat to the reagent 30 when the heating element 42 is activated. The cooling element 44 is configured to remove heat from the temperature-management module 36 when the heating element is not activated. Removing heat from the temperature-management module 36 blocks the heating element 42 from providing heat to other areas of the doser 20, such as the valve system 34, and causing those areas of the doser 20 to raise to a temperature where damage may occur.

The doser body 32 includes an outer doser housing 62, an inner doser conduit 64, and thermal insulation 66 as shown in FIG. 4. The outer doser housing 62 defines an interior space 68. The inner doser conduit 64 extends through the interior space 68 and defines the fluid passageway 38 that conducts reagent 30. The temperature-management module 36 is coupled to the inner doser conduit 64 to provide heat through the inner doser conduit 64 to the reagent flowing therethrough. The thermal insulation 66 is located in the interior space between the outer doser housing 62 and the inner doser conduit 64 to locate the temperature-management module 36 between the thermal insulation 66 and the inner doser conduit 64.

The valve system 34 includes a valve door 70 located in the fluid passageway 38, an armature 72 coupled to the valve door 70, a coil 74, and a biasing spring 76 as shown in FIG. 4. The valve door 70 is arranged to restrict flow or reagent 30 through the fluid passageway 38. The coil 74 may be energized to actuate the armature 72 and the valve door 70 to open the fluid passageway 38 and allow reagent 30 to flow therethrough. The biasing spring 76 is configured to push the armature 72 and the valve door 70 toward a closed position unit the coil 74 is energized to overcome a force provided by the biasing spring 76. The coil 74 is positioned in close proximity to the temperature-management module 36 to decrease a package space of the doser 20 as a whole. The coil 74 is in direct thermal communication with the temperature-management module 36 such that a temperature of the coil 74 increases and decreases in proportion with the temperature-management module 36.

The coil 74 is sensitive to elevated temperatures and may degrade overtime if exposed to elevated temperatures from the temperature-management module 36. The temperature-management module 36 is included as a part of temperature-management system 100 that is configured to control operation of the heating element 42 and the cooling element 44 to minimize damage to the coil 74 as shown in FIGS. 2 and 3. The temperature-management system 100 includes the temperature-management module 36, a control unit 102, and a sensor 104. The control unit 102 is configured to monitor and control operations of the temperature-management module 36 based on signals from the sensor 104 indicative of sensed conditions within the doser 20. The sensor 104 is located within the doser body 32 and is coupled to the control unit 102 to output signals that can be used by the control unit 102 to determine a temperature of the coil 74. The control unit 102 calculates a temperature of the coil 74 using the signals from the sensor 104 and activates or deactivates the heating element 42 and the cooling element 44 to minimize damage to the coil 74 by preventing overheating.

The signals output by the sensor 104 are indicative of sensed conditions of the valve system 34 that can be used to calculate the temperature of the coil 74 or other electrical components in doser 20. In one example, the sensed condition is an amount of force required to displace the armature 72 and open the valve door 70 to release reagent 30. In another example, the sensed condition is an amount of voltage, current, flowing through the coil 74 or a resistance of the coil 74. In yet another example, sensor 104 may be a designated sensor that directly measures the temperature of the coil 74 or another component in doser 20.

The control unit 102 is a vehicle control unit (VCU) in the illustrative embodiment. The control unit 102 includes a microprocessor 106 and a memory storage device 108 storing instructions that, when executed by the microprocessor 106 cause the heating element 42 and the cooling element 44 to activate or deactivate based on the sensed conditions of the valve system 34. The heating element 42 may be deactivated by the control unit 102 in response to a signal from the sensor 104 indicative that a temperature of the coil 74 is above a predetermined threshold and that the coil 74 may be damaged if heating continues. At the same time or closely thereafter, the cooling element 44 may be activated by the control unit 102 to remove heat from the temperature-management module 36 and thereby decrease the temperature of the valve system 34 to minimize damage.

The heating element 42 includes at least one electrically-conductive trace 48 arranged within the module body 40, an input node 50, and an output node 52 as shown in FIG. 6. The electrically-conductive trace 48 extends through the module body 40 in a plurality of directions to maximize an area covered by the electrically-conductive trace 48. The input node 50 is coupled to a power source 54 and interconnect the electrically-conductive trace 48 to the power source 54 to transmit electricity to the electrically-conductive trace 48 when activated so that the electrically-conductive trace can provide heat by joule heating. The output node 52 is coupled to an opposite end of the electrically-conductive trace 48 and is coupled to other circuitry in the doser 20 to complete a circuit with the power source 54 so that electricity may flow through the heating element 42 when activated.

The cooling element 44 is provided by at least one cooling-fluid passageway 56 that is formed in the module body 40 and extends through the module body 40 from an inlet 58 to an outlet 60 as shown in FIG. 6. The cooling-fluid passageway 56 extends across an entire length of the module body 40 to deliver a cooling fluid to the electrically-conductive trace 48 and remove heat therefrom. In one example, the cooling-fluid passageway 56 is the entire space within the module body 40 and surrounding the electrically-conductive trace 48. In another example, the module body 40 may be formed to include a plurality of cooling fluid passageways 56.

In some embodiments, the heating element 42 and the cooling element 44 are provided by the same component within the doser 20. In this example, the temperature-management module 36 is a thermo-electric device (TED) that provides heating or cooling depending on the direction of current flow through the TED.

A cooling-fluid system 110 is coupled to the at least one cooling fluid passageway 56 to deliver a cooling fluid and cool the heating element 42 as shown in FIG. 3. The cooling-fluid system 110 includes a cooling-fluid conduit 112 coupled to the at least one cooling passageway 56, cooling-fluid source 114, and a valve 116. The cooling-fluid conduit directs cooling fluid into the cooling passageway 56 formed in the temperature-management module 36. The cooling-fluid source 114 is configured to displace the cooling fluid through the cooling-fluid conduit to the cooling passageway. The cooling-fluid source 114 may be a designated pump or another pump used with at least one component on vehicle 10 that is separate from the aftertreatment system 14. In one example, the cooling-fluid source 114 is an air brake of the vehicle 10. The valve 116 is configured to restrict flow of cooling fluid through the cooling-fluid conduit until the cooling element 44 is activated.

In the illustrative embodiment shown in FIG. 1-6, the doser 20 includes a plurality of temperature-management modules 36 spaced circumferentially around the inner doser conduit 64 as shown in FIG. 5. Each temperature-management module 36 directly contacts an outer surface of the inner doser conduit 64 to provide heat through the inner doser conduit 64 to the reagent 30 in fluid passageway 38 by conduction. In some embodiments, the control unit 102 may be separate from the VCU of the vehicle 10. Additionally, the temperature-management module 36 may include a designated control unit and sensor all in one package within the doser 20.

Another embodiment of a doser 220 is shown in FIG. 7. Doser 220 is substantially similar to doser 20 shown in FIGS. 1-5 and described above. Accordingly, similar reference numbers in the 200 series are used to refer to common features between doser 20 and doser 220. The description of doser 20 is incorporated by reference herein for doser 220 except for the difference described below.

The doser 220 includes a doser body 232, a valve system 234 and a single temperature-management module 236 as shown in FIG. 7. The doser body 232 is configured to be mounted to a reagent mixer to discharge the reagent 30 into the reagent mixer when the combustion engine 12 is in operation and producing exhaust gas. The valve system 234 is configured to control release of the reagent 30 from the doser body 232 by selectively opening and closing a fluid passageway 238 formed by the doser body 232. The temperature-management module 236 is located within the doser body 232 and is configured to heat the reagent 30 in the fluid passageway 238 prior to the reagent being discharged into the reagent mixer.

The doser body 232 includes an outer doser housing 262, an inner doser conduit 264, and thermal insulation 266 as shown in FIG. 7. The outer doser housing 262 defines an interior space 268. The inner doser conduit 264 extends through the interior space 268 and defines the fluid passageway 238 that conducts reagent 30. The temperature-management module 236 is coupled to the inner doser conduit 64 to provide heat through the inner doser conduit 264 to the reagent flowing therethrough. The thermal insulation 266 is located in the interior space between the outer doser housing 262 and the inner doser conduit 264 to locate the temperature-management module 236 between the thermal insulation 266 and the inner doser conduit 264. The temperature-management module 236 extends circumferentially around the inner doser conduit 264 uninterrupted. In other embodiments the inner doser conduit may be omitted and the temperature-management module 236 may define the fluid passageway 238 and provide heat for reagent 30 flowing therethrough.

In some embodiments, cooling an electrically heated diesel emissions fluid (DEF) doser may use an external mechanical cooling housing. Doser components may have a maximum temperature requiring the cooling effect. The heated DEF doser may use electrically powered heaters. The heaters may use a heating element to convert electrical energy into heat through the process of joule heating. Heating may warm the DEF to a prescribed temperature. The heater may have at least one transverse channel available for the purpose of cooling when desired. The cooling medium could include air, engine coolant, or an engineered coolant. The cooling effect provided by the cooling channel may allow the cooling housing to be omitted.

In some embodiments, when the heater is not heating the DEF, then the cooling feature may be engaged or activated. The cooling medium may be air or liquid coolant depending on efficiencies desired. The cooling effect may protect the electrical components on the heated doser below a maximum threshold temperature (i.e. <200 C). This may eliminate the need for a separate external cooling housing.

In some embodiments, the heater may have micro-machined or laser cut channels internal to the heater to provide one or more cooling paths for the cooling fluid to flow. When the electronic components in the doser reach a maximum threshold temperature, the heater voltage could be removed, and the cooling medium applied. This may provide safe temperature levels of sensitive doser components (i.e. coil 74). The cooling channel geometry could be square, rectangular, or round depending on best efficiency.

In some embodiments, the cooling effect could also occur by using Peltier/Seebech effect and by reversing the voltage applied depending on if heating or cooling is desired. Reduces the need for an extra cooling housing. Using a peltier module may reduce components in the doser. Using air as a cooling source may remove the need to contain environmentally harmful engine coolant.

The following numbered clauses include embodiments that are contemplated and non-limiting:

Clause 1. A doser for injecting reagent into a stream of exhaust gas in order to enable chemical reaction of the exhaust gas to reduce nitrogen-oxides in the exhaust gas, the doser including a doser body including an outer doser housing defining an interior space, an inner doser conduit that extends through the interior space and defines a fluid passageway configured to conduct the reagent, and thermal insulation located in the interior space between the outer doser housing and the inner doser conduit.

Clause 2. The doser of clause 1, any other clause, or any suitable combination of clauses, further comprising a valve system configured to selectively open the fluid passageway to allow the reagent to flow through the fluid passageway.

Clause 3. The doser of clause 2, any other clause, or any suitable combination of clauses, further comprising a temperature-management module including a module body thermally connected to the inner doser conduit, a heating element arranged within the module body that is configured to heat the module body and the inner doser conduit when active thereby raising a temperature of the reagent in the fluid passageway ahead of mixing with the exhaust gas, and a cooling element arranged within the module body that is configured to cool the module body and the inner doser conduit and, in turn, other parts of the doser to prevent damage to electronic components of the valve system.

Clause 4. The doser of clause 3, any other clause, or any suitable combination of clauses, wherein the cooling element is provided by at least one cooling passageway that extends through the module housing to conduct cooling fluid to the heating element and cool the heating element.

Clause 5. The doser of clause 4, any other clause, or any suitable combination of clauses, wherein the at least one cooling passageway extends across the entire length of the module body.

Clause 6. The doser of clause 3, any other clause, or any suitable combination of clauses, wherein the valve system includes a valve door located in the fluid passageway and arranged to restrict flow of the reagent therethrough, an armature coupled to the valve door, and a coil in direct thermal communication with the temperature-management module configured to actuate the armature to displace the valve door and allow flow of the reagent through the fluid passageway.

Clause 7. The doser of clause 3, any other clause, or any suitable combination of clauses, wherein doser comprises a plurality of temperature-management modules spaced circumferentially around the inner doser conduit.

Clause 8. The doser of clause 3, any other clause, or any suitable combination of clauses, wherein the heating element includes at least one conductive trace that extends through the module body in a plurality of directions.

Clause 9. The doser of clause 3, any other clause, or any suitable combination of clauses, wherein the heating element and cooling element are provided by a thermoelectric device that provides heat to the inner doser conduit when electrical current flows through the thermoelectric device in a first direction and removes heat away from the inner doser conduit when electrical current flows through the thermoelectric device in an opposite second direction.

Clause 10. An over-the-road vehicle comprising a combustion engine configured to combust fuel and air and produce exhaust gas.

Clause 11. The vehicle of clause 10, any other clause, or any suitable combination of clauses, further comprising an exhaust aftertreatment system configured to remove pollutants from the exhaust gas prior to the exhaust gas being released into atmosphere, the exhaust aftertreatment system comprising (i) a selective catalytic reduction unit (SCR), (ii) a doser located upstream of the SCR and configured inject reagent into the exhaust gas in order to enable chemical reaction of the exhaust gas with a catalyst in the SCR, and (iii) a temperature-management system configured to control a temperature of the reagent and electrical components within the doser.

Clause 12. The vehicle of clause 11, any other clause, or any suitable combination of clauses, wherein the temperature-management system includes a temperature-management module thermally connected to the doser and having a heating element and a cooling element, a sensor configured to output a sensor signal associated with the temperature within the doser, and a controller that receives the sensor signal from the sensor, the controller including a microprocessor and a memory storage device storing instructions that, when executed by the microprocessor, deactivates the heating element and activates the cooling element in response to the temperature of the electrical components within the doser reaching a predetermined threshold.

Clause 13. The vehicle of clause 12, any other clause, or any suitable combination of clauses, wherein the cooling element is provided by at least one cooling passageway that extends through an entire length of the temperature-management module to conduct cooling fluid to the heating element and cool the heating element.

Clause 14. The vehicle of clause 13, any other clause, or any suitable combination of clauses, further comprising a cooling-fluid supply system including a cooling fluid conduit coupled to the at least one cooling passageway, cooling-fluid source configured to displace cooling fluid through the cooling-fluid conduit to the cooling passageway, and a valve configured to restrict flow of cooling fluid through the cooling-fluid conduit until the cooling element is activated.

Clause 15. The vehicle of clause 14, any other clause, or any suitable combination of clauses, wherein the cooling fluid pump is configured to displace cooling fluid to a first component of the vehicle that is separate from the exhaust aftertreatment system when the valve is in a closed position.

Clause 16. The vehicle of clause 12, any other clause, or any suitable combination of clauses, wherein the doser includes (i) a doser body including an outer doser housing defining an interior space, an inner doser conduit that extends through the interior space and defines a fluid passageway configured to conduct the reagent, and thermal insulation between the inner doser conduit and the outer doser housing, and (ii) a valve system configured to selectively open the fluid passageway to allow the reagent to flow through the fluid passageway.

Clause 17. The vehicle of clause 16, any other clause, or any suitable combination of clauses, wherein the temperature-management module is coupled to the inner doser conduit and the sensor signal is based at least in part on a condition of the valve system associated with the temperature of the electronic components in the doser.

Clause 18. A method of injecting reagent into a stream of exhaust gas with a dosing device in order to enable chemical reaction of the exhaust gas to reduce nitrogen-oxides in the exhaust gas, the method including heating the reagent with a temperature-management module prior to the reagent being injected into the exhaust gas.

Clause 19. The method of clause 18, any other clause, or any suitable combination of clauses, further including a step of determining a temperature of an area adjacent the temperature-management module.

Clause 20. The method of clause 19, any other clause, or any suitable combination of clauses, further including a step of comparing the temperature of the area adjacent the temperature-management module to a predetermined threshold.

Clause 21. The method of clause 20, any other clause, or any suitable combination of clauses, further including a step of cooling the temperature-management module if the temperature of the area adjacent the temperature management module is above the predetermined threshold.

Clause 22. The method of clause 21, any other clause, or any suitable combination of clauses, wherein the step of determining a temperature of the area adjacent the temperature management module includes sensing a condition of a valve system included in the temperature-management module and calculating a temperature of at least a portion of the valve system based on the condition.

The temperature-management module 36 is located in a space formed between the thermal insulation 66 and the inner doser conduit 64, as shown in FIGS. 4 and 5. The thermal insulation 66 and the inner doser conduit 64 cooperate to establish an annular module-receiving channel in the space and the temperature-management module 36 is located in the annular module-receiving channel, as shown in FIG. 5. The temperature-management module 36 may comprise four heating elements 42 and four cooling elements 44, as shown in FIG. 5. The temperature-management module 236 may have an annular shape, as shown in FIG. 7. The temperature-management module 236 extends circumferentially around the inner doser conduit 264 uninterrupted and an inner surface of the temperature-management module 236 faces toward an outer surface of the inner doser conduit 264, as shown in FIG. 7.

The inner doser conduit 64 and the thermal insulation 66 cooperate to form an annular space surrounding the inner doser conduit 64 and the heating element 42 is arranged to lie in the annular space, as shown in FIG. 5. The heating element 42 may extend uninterrupted through the annular space formed cooperatively by the inner doser conduit 264 and the thermal insulation 266, as shown in FIG. 7.

The inner doser conduit 64 and the thermal insulation 66 cooperate to form an annular space surrounding the inner doser conduit 64 and the cooling element 44 is arranged to lie in the annular space, as shown in FIG. 5. The cooling element 44 may extend uninterrupted through the annular space formed cooperatively by the inner doser conduit 264 and the thermal insulation 266, as shown in FIG. 7.

The heating element 42 includes the electrically conductive trace 48 and the at least one cooling-fluid passageway 56 extends in transverse relation to the electrically conductive trace 48, as shown in FIG. 6. The heating element 42 includes two horizontally extending electrically conductive traces 48 arranged to lie in spaced-apart parallel relation to one another and the at least one cooling-fluid passageway 56 is arranged to extend downwardly in transverse relation to each of the two horizontally extending electrically conductive traces 48, as shown in FIG. 6.

The plurality of temperature-management modules 36 includes a second temperature-management module arranged to lie in spaced-apart relation to a first temperature-management module in the plurality of temperature-management modules 36 to locate the inner doser conduit 64 therebetween, as shown in FIG. 5. The plurality of temperature-management modules 36 includes a third temperature-management module arranged to lie in spaced-apart relation to a fourth temperature-management module in the plurality of temperature-management modules 36 to locate the inner doser conduit 64 therebetween, as shown in FIG. 5. The second temperature-management module is positioned to lie in a space between the third temperature-management module and the fourth temperature-management module without touching the third temperature-management module and the fourth temperature-management module, as shown in FIG. 5. The third temperature-management module lies in opposed spaced-apart relation to the fourth temperature-management module to surround the inner doser conduit 64 and to cause a concave inner surface of the third temperature-management module to face toward a concave inner surface of the fourth temperature-management module, as shown in FIG.

The first temperature-management module in the plurality of temperature-management modules 36 includes a concave inner surface facing toward a convex outer surface of the inner doser conduit 64, as shown in FIG. 5. Each temperature-management module 36 in the plurality of temperature-management modules includes a concave inner surface. The first temperature-management module in the plurality of temperature-management modules 36 includes a concave inner surface facing away from a concave inner surface of the thermal insulation 66, as shown in FIG. 5.

The doser 20 includes the doser body 32 including the outer doser housing 62 defining the interior space 68, the inner doser conduit 64 that extends through the interior space 68 and defines the fluid passageway 38 configured to conduct the reagent 30, and the temperature-management module 36 between the inner doser conduit 64 and an outer doser housing 62, and the valve system 34 configured to selectively open the fluid passageway 38 to allow the reagent 30 to flow through the fluid passageway 38, as shown in FIG. 4.

The invention claimed is:

1. A doser for injecting reagent into a stream of exhaust gas in order to enable chemical reaction of the exhaust gas to reduce nitrogen-oxides in the exhaust gas, the doser comprising
a doser body including an outer doser housing defining an interior space, an inner doser conduit that extends through the interior space and defines a fluid passageway configured to conduct the reagent, and thermal insulation located in the interior space between the outer doser housing and the inner doser conduit,
a valve system configured to selectively open the fluid passageway to allow the reagent to flow through the fluid passageway, and
a temperature-management module including a module body thermally connected to the inner doser conduit, a heating element arranged within the module body that is configured to heat the module body and the inner doser conduit when active thereby raising a temperature of the reagent in the fluid passageway ahead of mixing with the exhaust gas, and a cooling element arranged within the module body that is configured to cool the module body and the inner doser conduit and, in turn, other parts of the doser to prevent damage to electronic components of the valve system.

2. The doser of claim 1, wherein the valve system includes a valve door located in the fluid passageway and arranged to restrict flow of the reagent therethrough, an armature coupled to the valve door, and a coil in direct thermal communication with the temperature-management module configured to actuate the armature to displace the valve door and allow flow of the reagent through the fluid passageway.

3. The doser of claim 1, wherein the heating element includes at least one conductive trace that extends through the module body in a plurality of directions.

4. The doser of claim 1, wherein the heating element and cooling element are provided by a thermoelectric device that provides heat to the inner doser conduit when electrical current flows through the thermoelectric device in a first direction and removes heat away from the inner doser conduit when electrical current flows through the thermoelectric device in an opposite second direction.

5. The doser of claim 1, wherein the temperature-management module extends circumferentially around the inner doser conduit uninterrupted and an inner surface of the temperature-management module faces toward an outer surface of the inner doser conduit.

6. The doser of claim 1, wherein the inner doser conduit and the thermal insulation cooperate to form an annular space surrounding the inner doser conduit and the heating element is arranged to lie in the annular space.

7. The doser of claim 6, wherein the heating element extends uninterrupted through the annular space formed cooperatively by the inner doser conduit and the thermal insulation.

8. The doser of claim 1, wherein the inner doser conduit and the thermal insulation cooperate to form an annular space surrounding the inner doser conduit and the cooling element is arranged to lie in the annular space.

9. The doser of claim 8, wherein the cooling element extends uninterrupted through the annular space formed cooperatively by the inner doser conduit and the thermal insulation.

10. The doser of claim 1, wherein the cooling element is provided by at least one cooling passageway that extends through the module body to conduct cooling fluid to the heating element and cool the heating element.

11. The doser of claim 10, wherein the at least one cooling passageway extends across the entire length of the module body.

12. The doser of claim 10, wherein the heating element includes an electrically conductive trace and the at least one cooling passageway extends in transverse relation to the electrically conductive trace.

13. The doser of claim 12, wherein the heating element includes two horizontally extending electrically conductive traces arranged to lie in spaced-apart parallel relation to one another and the at least one cooling passageway is arranged to extend downwardly in transverse relation to each of the two horizontally extending electrically conductive traces.

14. The doser of claim 1, wherein the temperature-management module is located in a space formed between the thermal insulation and the inner doser conduit.

15. The doser of claim 14, wherein the thermal insulation and the inner doser conduit cooperate to establish an annular module-receiving channel in the space and the temperature-management module is located in the annular module-receiving channel.

16. The doser of claim 15, wherein the temperature-management module comprises four heating elements and four cooling elements.

17. The doser of claim 15, wherein the temperature-management module has an annular shape.

18. The doser of claim 1, wherein the doser comprises a plurality of temperature-management modules spaced circumferentially around the inner doser conduit.

19. The doser of claim 18, wherein a first temperature-management module in the plurality of temperature-management modules includes a concave inner surface facing toward a convex outer surface of the inner doser conduit.

20. The doser of claim 18, wherein each temperature-management module in the plurality of temperature-management modules includes a facing toward an exterior surface of the inner doser conduit.

21. The doser of claim 18, wherein a first temperature-management module in the plurality of temperature-management modules includes a concave inner surface facing away from a concave inner surface of the thermal insulation.

22. The doser of claim 18, wherein the plurality of temperature-management modules includes a second temperature-management module arranged to lie in spaced-apart relation to a first temperature-management module in the plurality of temperature-management modules to locate the inner doser conduit therebetween.

23. The doser of claim 22, wherein the plurality of temperature-management modules includes a third temperature-management module arranged to lie in spaced-apart relation to a fourth temperature-management module in the plurality of temperature-management modules to locate the inner doser conduit therebetween.

24. The doser of claim 23, wherein the second temperature-management module is positioned to lie in a space between the third temperature-management module and the fourth temperature-management module without touching the third temperature-management module and the fourth temperature-management module.

25. The doser of claim 24, wherein the third temperature-management module lies in opposed spaced-apart relation to the fourth temperature-management module to surround the inner doser conduit and to cause a concave inner surface of the third temperature-management module to face toward a concave inner surface of the fourth temperature-management module.

26. An over-the-road vehicle comprising
a combustion engine configured to combust fuel and air and produce exhaust gas, and
an exhaust aftertreatment system configured to remove pollutants from the exhaust gas prior to the exhaust gas being released into atmosphere, the exhaust aftertreatment system comprising (i) a selective catalytic reduction unit (SCR), (ii) a doser located upstream of the SCR and configured inject reagent into the exhaust gas in order to enable chemical reaction of the exhaust gas with a catalyst in the SCR, and (iii) a temperature-management system configured to control a temperature of the reagent and electrical components within the doser,
wherein the temperature-management system includes a temperature-management module thermally connected to the doser and having a heating element and a cooling element, a sensor configured to output a sensor signal associated with the temperature within the doser, and a controller that receives the sensor signal from the sensor, the controller including a microprocessor and a memory storage device storing instructions that, when executed by the microprocessor, deactivates the heating element and activates the cooling element in response to the temperature of the electrical components within the doser reaching a predetermined threshold.

27. The vehicle of claim 26, wherein the cooling element is provided by at least one cooling passageway that extends through an entire length of the temperature-management module to conduct cooling fluid to the heating element and cool the heating element.

28. The vehicle of claim 26, wherein the doser includes a doser body including an outer doser housing defining an interior space, an inner doser conduit that extends through the interior space and defines a fluid passageway configured to conduct the reagent, and the temperature-management module between the inner doser conduit and the outer doser housing, and a valve system configured to selectively open the fluid passageway to allow the reagent to flow through the fluid passageway.

29. The vehicle of claim 27, further comprising a cooling-fluid supply system including a cooling fluid conduit coupled to the at least one cooling passageway, a cooling-fluid source configured to displace cooling fluid through the cooling-fluid conduit to the cooling passageway, and a valve configured to restrict flow of cooling fluid through the cooling-fluid conduit until the cooling element is activated.

30. The vehicle of claim 29, wherein a cooling fluid pump is configured to displace cooling fluid to a first component of the vehicle that is separate from the exhaust aftertreatment system when the valve is in a closed position.

31. The vehicle of claim 26, wherein the doser includes (i) a doser body including an outer doser housing defining an interior space, an inner doser conduit that extends through the interior space and defines a fluid passageway configured to conduct the reagent, and thermal insulation between the inner doser conduit and the outer doser housing, and (ii) a valve system configured to selectively open the fluid passageway to allow the reagent to flow through the fluid passageway.

32. The vehicle of claim 31, wherein the temperature-management module is coupled to the inner doser conduit and the sensor signal is based at least in part on a condition of the valve system associated with the temperature of the electronic components in the doser.

33. A method of injecting reagent into a stream of exhaust gas with a dosing device in order to enable chemical reaction of the exhaust gas to reduce nitrogen-oxides in the exhaust gas, the method comprising
heating the reagent with a temperature-management module prior to the reagent being injected into the exhaust gas,
determining a temperature of an area adjacent the temperature-management module,
comparing the temperature of the area adjacent the temperature-management module to a predetermined threshold, and
cooling the temperature-management module if the temperature of the area adjacent the temperature management module is above the predetermined threshold.

34. The method of claim 33, wherein the step of determining a temperature of the area adjacent the temperature management module includes sensing a condition of a valve system included in the temperature-management module and calculating a temperature of at least a portion of the valve system based on the condition.

* * * * *